United States Patent [19]
Knight

[11] Patent Number: 5,934,561
[45] Date of Patent: Aug. 10, 1999

[54] SPRAY APPARATUS HAVING AN AGITATION LINE

[76] Inventor: Brian George Knight, Wireless Hill, South Luffenham, United Kingdom, LE15 8NF

[21] Appl. No.: 08/913,907
[22] PCT Filed: Feb. 27, 1996
[86] PCT No.: PCT/GB96/00434
§ 371 Date: Sep. 24, 1997
§ 102(e) Date: Sep. 24, 1997
[87] PCT Pub. No.: WO96/51118
PCT Pub. Date: Oct. 10, 1996
[51] Int. Cl.⁶ .................................................. A01M 7/00
[52] U.S. Cl. ........................................ 239/124; 239/142
[58] Field of Search .................................. 239/104, 112, 239/124, 126, 127, 310, 142; 222/159

[56] References Cited

U.S. PATENT DOCUMENTS

| | | | |
|---|---|---|---|
| 3,061,198 | 10/1962 | Kerr et al. | 239/124 |
| 4,121,767 | 10/1978 | Jensen | 239/124 |
| 4,291,820 | 9/1981 | Marrington | 222/70 |
| 4,721,245 | 1/1988 | Van Zweeden | 239/127 |
| 4,771,945 | 9/1988 | Martin | 239/127 |
| 4,913,345 | 4/1990 | Setter | 239/127 |
| 5,004,155 | 4/1991 | Dashevsky | 239/127 |
| 5,409,310 | 4/1995 | Owczarz | 239/127 |
| 5,520,333 | 5/1996 | Tofte | 239/127 |
| 5,704,546 | 1/1998 | Henderson et al. | 239/124 |

FOREIGN PATENT DOCUMENTS

| | | |
|---|---|---|
| 2555469 | 5/1985 | France . |
| 677655 | 8/1952 | United Kingdom . |

*Primary Examiner*—Andres Kashnikow
*Assistant Examiner*—Lisa A. Douglas
*Attorney, Agent, or Firm*—Townsend and Townsend and Crew LLP

[57] ABSTRACT

Agricultural or horticultural spray apparatus of the kind comprising a holding tank having a liquid to be sprayed, at least one spray nozzle, a pump for moving liquid from the tank and for causing the liquid to be sprayed from the nozzle, and a return line from the nozzle to the tank, characterized in that the return line is provided between the pump and the spray nozzle, and characterized by a venturi device for causing a depression in the return line to cause liquid to flow from the nozzle to the tank. The apparatus includes a line from the tank to each nozzle through which liquid is drawn when a depression is applied to the return line.

16 Claims, 1 Drawing Sheet

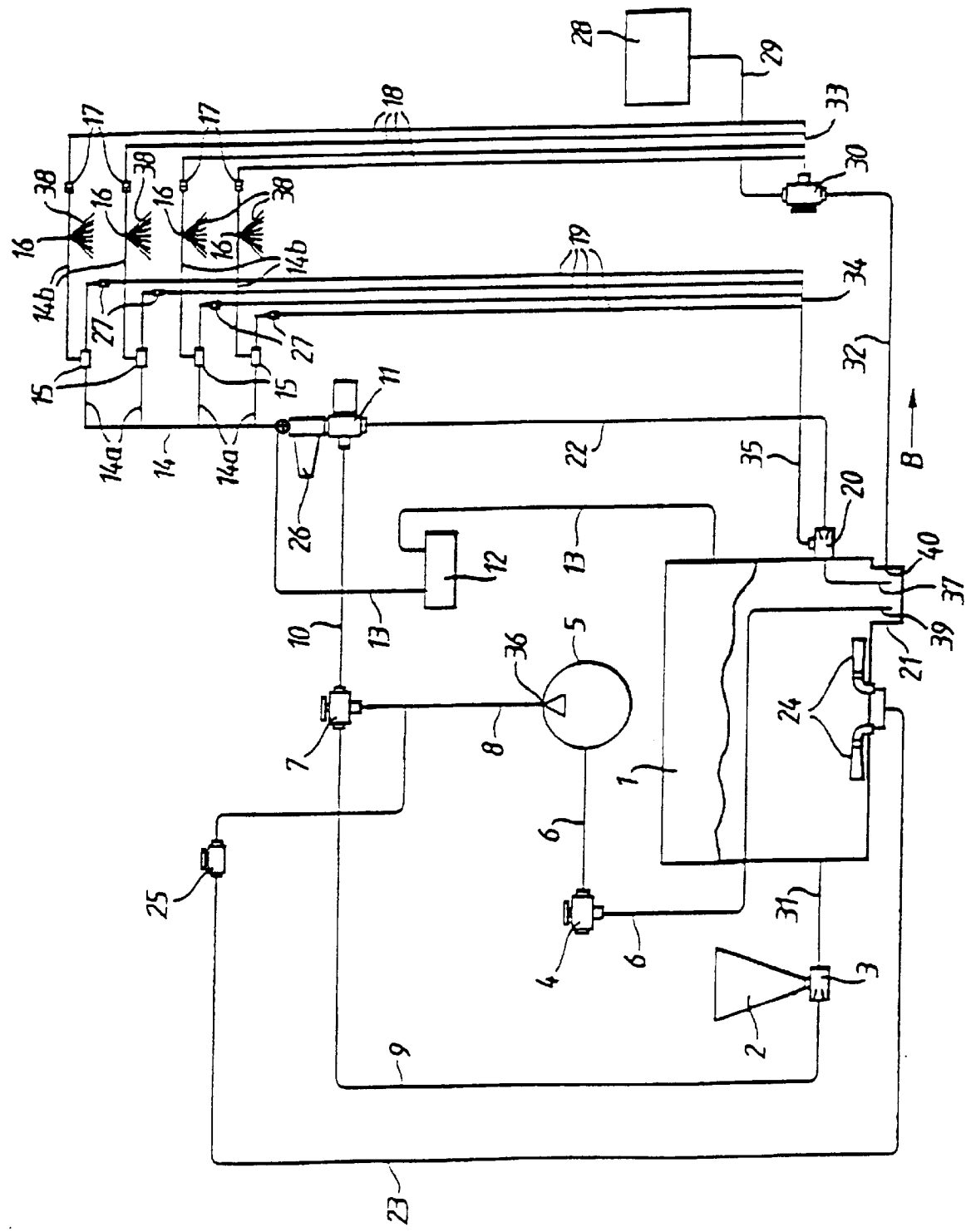

SPRAY APPARATUS HAVING AN AGITATION LINE

TECHNICAL FIELD

The invention relates to spray apparatus and more particularly to liquid chemical spray apparatus for use in agriculture or in horticulture. Normally in agriculture such spray apparatus is mounted on a tractor or a tractor-drawn vehicle and comprises a boom or pair of booms carrying spray nozzles along the length of the boom so that an area of land many meters wide can be treated with the spray at each pass of the tractor.

BACKGROUND ART

One problem with known spray apparatus is that many liquid chemical mixtures or compositions to be applied to crops or to weeds may not be true solutions and often comprise a chemical or mixture of chemicals and a bulky powdered filler e.g. of chalk. Such materials tend to deposit a sediment in the spray apparatus unless continually agitated. Such sediment may be detrimental to the operation of the spray apparatus or may simply require removal in a time wasting operation.

To promote agitation of liquid spray materials it is known to provide an agricultural spray apparatus comprising a liquid chemical holding tank, a boom formed with spray nozzles along its length, a pump for forcing liquid from the tank to the nozzles, and conduits (hereafter lines) connecting the tank, pump and nozzles, with a return line from the spray nozzles to the holding tank. A disadvantage of such apparatus is that it is then difficult accurately to meter the amount of liquid spray material applied to the field by the apparatus since the metering device depends on measuring flow rate and thus needs to take account of the quantity of liquid which is returned from the nozzles to the tank.

Another problem with known spray apparatus is that dripping of liquid spray material from the nozzles tends to occur after spraying has been discontinued. Such dripping is wasteful of chemical and potentially harmful to plants, animals and to the spray operator. It is thus known to apply vacuum to the lines of a spray apparatus when spraying is discontinued to assist the operation of anti-drip valves, i.e. diaphragm check valves provided in the lines at the spray nozzles.

A further disadvantage with known spray apparatus is that it is often necessary to wash out the sprayer, e.g. the spray lines and tank after use, usually with clean water, to prevent clogging of the lines of the sprayer, but it is not possible subsequently to remove the water from the lines except by displacing the water with liquid to be sprayed when the sprayer is next used. Thus when the operator first uses the spray apparatus after cleaning he must run the sprayer for a period of time, usually while stationary, to displace the water from the lines before commencing spraying. However if the operator runs the sprayer for too long a period of time while stationary, liquid spray will be wasted and the headland of the field will be contaminated with the heavy concentration of spray. It is thus common to find such "burnt" patches often next to hedgerows or ditches in fields and the environmental implications are clearly apparent. If, alternatively, the operator starts spraying before all of the cleaning water has been displaced from the spray lines, a part of the field will not be effectively treated by the spray.

An object of the invention is to provide improved means for agitating liquid spray mixtures in the sprayer device. Preferably this agitation will happen automatically i.e. without the need for intervention by the operator, e.g. constantly or when spraying ceases. Preferably the agitation will also occur when the spray apparatus is being filled.

It is a another object of the invention to provide means for preventing or mitigating dripping from the spray nozzles.

It is a further object of the invention to provide means for purging the lines of the sprayer of cleaning or other liquid after use to permit immediate start-up without the need to exhaust cleaning water from the lines.

DISCLOSURE OF THE INVENTION

According to the invention there is provided spray apparatus of the kind comprising a holding tank for liquid to be sprayed, at least one spray nozzle, means, e.g. a pump, for moving liquid from the tank and for causing the liquid to be sprayed from the nozzle and a return line from the nozzle to the tank, characterised in that the return line is provided between the liquid-moving means and the spray nozzle, and characterised by means for causing a depression in the return line to cause liquid to flow from the nozzle to the tank. Normally a plurality of such nozzles is provided on the spray apparatus and the line from the tank to each nozzle is under control of a separate shut-off valve. In such a case the return line is preferably disposed between the respective shut-off valve and the associated nozzle.

Preferably the means for causing a depression in the return line is a venturi device powered by circulating liquid. Thus the device can be powered directly from the liquid moving means, e.g. the pump.

Preferably the spray apparatus comprises a line from the tank to the or each nozzle and through which liquid is drawn when a depression is applied to the return line. A clear section is provided in any one of the lines to provide a visual indication of contents.

BRIEF DESCRIPTION OF DRAWINGS

The invention is diagrammatically illustrated by way of example in the accompanying drawing, which is a circuit or flow diagram of an agricultural spray apparatus.

BEST MODE FOR CARRYING OUT THE INVENTION

In the drawings there is shown agricultural spray apparatus comprising a liquid spray chemical holding tank 1 which is connected to spray nozzles 16 via a pump 5 to produce a series of sprays 38. Although not shown in the drawings, the spray apparatus is usually mounted on an agricultural tractor or on a tractor-drawn trailer and comprises a spray boom having a pair of laterally extendible arms carrying the spray nozzles at intervals along their lengths so that an area of land many meters wide can be treated with sprayed chemical at each pass of the tractor. Each arm of the spray boom usually comprises a plurality of hinged sections which can be folded e.g. for storage, transport or to vary the effective boom length. Such apparatus is well known as such and requires no further description.

In greater detail the tank 1 is formed at its base with a sump 21 in which is disposed the end 39 of a feed line 6 which is connected to the pump 5 under the control of a valve 4 through which water can be introduced into the apparatus in conventional fashion. The outlet 36 of the pump 5 feeds a line 8 which is connected to a three-way valve 7 so that the pump output can be fed either to a line 9 or to a line 10 under the control of the operator. The line 9 is connected to a chemical filling hopper 2 via a venturi device 3 through which chemical can be introduced to the system. The output of the venturi device 3 is fed directly to the tank 1 through a line 31.

The line 10 is connected to a three-way valve 11, control of which is discussed below, and the output of which goes either to a line 14, via a filter 26, to feed the spray nozzles 16 or to a line 22 connected to a venturi device 20 more fully described below. Line 14 is in the form of a manifold feeding branches 14a each under the control of a three-way valve 15 by which flow of liquid to the individual spray nozzles or different sections of the boom can be shut off when appropriate. The outputs from the valves 15 are fed either to lines 14b connected directly to the spray nozzles 16 or are diverted to tank return lines 19 connected to the tank 1 via a venturi device 20. The venturi device 20 has an outlet 37 extending into the sump 21. The lines 19 are under the control of anti-surge valves 27 positioned adjacent to the respective valves 15. These valves 27 are intended to prevent pressure surges caused, for example, by a closing valve from passing backwards along the lines 19 and causing momentary actuation of the spray nozzles. The lines 19 are connected together at a manifold 34 communicating with the venturi device 20 via a line 35.

The spray nozzles 16 are also connected to the tank 1 through lines 18 under the control of non-return valves 17 which permit flow only in the direction indicated by arrow B. The lines 18 are connected together at a manifold 33 which communicates with a line 32 connected to the tank sump 21.

A pressure regulator 12 is connected between the line 14 and the tank 1 via a line 13 to permit adjustment of the application rate of the spray chemical to the crop as appropriate. A line 23 is connected to the line 8 to provide liquid under pressure to power an agitator 24 in the base of the tank 1 to keep the chemical spray material in suspension. Since agitation is not always required, the line 23 is under control of a valve 25.

Although not shown in the drawing, it may be possible to replace the valve 11 by a simple on/off valve in the line 22. This may have the, perhaps beneficial, effect of maintaining the line 14 and lines 14a under pressure and improve the speed of response of the spray apparatus when the valves 15 are opened.

The valve 7 may be replaced by a pair of on/off valves so that flow from the pump 5 can pass along lines 9 and 10 simultaneously or separately.

During filling of the spray apparatus with chemical, the feed of liquid spray from the pump 5 to the spray nozzles 16 is discontinued by operation of the valve 7 so that liquid passes back to the tank along line 9 to power the venturi device 3 to induce chemical into the apparatus.

When spraying is halted, e.g. at the end of each bout, feed of liquid to the spray nozzles 16 is discontinued by actuation of the valve 11 and instead liquid is diverted by the valve 11 along the line 22 and thus back to the tank 1. This activates the venturi 20 which causes a depression in the lines 19 so that liquid is evacuated from the spray lines 14b. Also liquid is drawn from the tank through the lines 18 so that the liquid is agitated to prevent settling out of solid particles.

It will be noted that the line 32 joins the tank 1 at an outlet 40 the base of the sump 21. It is preferred that the height of the outlet 40 to line 32 in the sump is lower than the outlet 39 to line 6 to minimise the risk of drawing air into the spray lines before liquid stops feeding to the pump 5.

INDUSTRIAL APPLICABILITY

Thus the crop spray apparatus described above has the following features and advantages:

Agitation of boom spray lines including feed lines and boom section control valves by vacuum.

Displacement and thus agitation of liquid in the lines without spraying from the nozzles.

Removal of chemical from the lines for safe transport of the apparatus and to comply with environmental pressures requiring that a crop sprayer is guaranteed drip free before transport on the highway. This may be by displacing the chemical with clean water or with air. The air or water can then be replaced with spray chemical on arrival at the field.

Preferably the apparatus uses clear spray lines or incorporates clear sections within the lines for visual indication of contents.

Agitation of the spray lines and contents of the sprayer tank when the apparatus is not spraying.

Apparatus is able to spray correct chemical dilution as soon as the apparatus is switched to spray. Conventionally this is not possible because the apparatus must spray from the nozzles until the clean water within it is replaced by chemical. This can only be guessed at by the driver and often leads to an excessive dose of chemical being applied to part of the field headland. In the apparatus of the invention clean water can be introduced into the system via a three-way valve 30 in a line 32 from a separate clean water supply tank 28 on the apparatus.

Use of a non-return valve in the spray line so that agitation only takes places in one direction and not the other.

Apparatus can be washed out without the need to spray from the nozzles. This facility may have significant implications because of continuing environmental pressure.

Apparatus circulates spray chemical through the boom as the apparatus is filled with water.

Apparatus circulates through the spray lines by vacuum.

The conventional problem of expelling the clean water from the spray line when first starting spraying is eliminated.

Previous systems agitate the spray line only when the apparatus is spraying and therefore cannot be used with a flow based control system because the agitation flow is recorded and the machine assumes it has been applied to the crop.

Spray lines can be washed out with clean water without spraying chemical out of the nozzles so that the apparatus is environmentally friendly.

I claim:

1. Spray apparatus of the kind comprising a holding tank for liquid to be sprayed, at least one spray nozzle, means for moving liquid from the tank and for causing the liquid to be sprayed from the nozzle and a return line from the nozzle to the tank, characterized in that the return line is provided between the means for moving liquid and the spray nozzle, and characterized by means for causing a depression in the return line to cause liquid to flow from the nozzle to the tank, by an agitation line from the tank to each nozzle and through which liquid is drawn when the depression is applied to the return line, and by a non-return valve in each agitation line to prevent flow along the agitation line from the nozzle to the tank.

2. Spray apparatus according to claim 1, characterized by a shut-off valve in a feed line between the liquid moving means and each nozzle and characterized in that the return line is disposed between the respective shut-off valve and its corresponding nozzle.

3. Spray means according to claim 1, characterized in that the means for causing a depression in the return line is a venturi device.

4. Spray apparatus according to claim 3, characterized in that the venturi device is powered from the liquid moving means.

5. Spray apparatus according to claim 1 comprising flow-rate metering means.

6. Spray apparatus according to claim 1, characterized by means for introducing cleaning water into the or each line when a depression is applied to the return line, such that the cleaning water is circulated through the lines and is collected in the tank for later disposal.

7. Spray apparatus, according to claim 1 comprising a clear section in any one of the lines to provide a visual indication of contents.

8. Spray apparatus comprising:

a holding tank for holding a liquid to be sprayed;

at least one spray nozzle;

a pump to move liquid from the tank and to cause the liquid to be sprayed from the nozzle;

a return line from the nozzle to the tank, wherein the return line is provided between the pump and the spray nozzle; and a depression mechanism to cause a depression in the return line to cause liquid to flow from the nozzle to the tank;

an agitation line from the tank to the nozzle and through which liquid is drawn when the depression is applied to the return line; and a non-return valve in the agitation line to prevent flow along the agitation line from the nozzle to the tank.

9. Apparatus as in claim 8, wherein the depression mechanism comprises a venturi device.

10. Spray apparatus of the kind comprising a holding tank for liquid to be sprayed, a liquid circuit having at least one spray nozzle, means and a feed line for moving liquid from the tank and for causing the liquid to be sprayed from the nozzle and a return line from the nozzle to the tank and means for creating a depression in the liquid circuit such that the liquid is circulated past the nozzle in the opposite direction when spraying is stopped to prevent blockages, the return line being provided between the means for moving liquid and the spray nozzle, the means for creating a depression being disposed to cause the depression in the return line to cause liquid to flow from the nozzle to the tank, and comprising an agitation line from the tank to each nozzle and through which liquid is drawn when the depression is applied to the return line, and characterized by a non-return valve in each agitation line to prevent flow along the agitation line from the nozzle to the tank.

11. Spray apparatus according to claim 10, characterized by a shut-off valve in a feed line between the liquid moving means and each nozzle and characterized in that the return line is disposed between the respective shut-off valve and its corresponding nozzle.

12. Spray means according to claim 10, characterized in that the means for causing a depression in the return line is a venturi device.

13. Spray apparatus according to claim 12, characterized in that the venturi device is powered from the liquid moving means.

14. Spray apparatus according to claim 10 comprising flow-rate metering means.

15. Spray apparatus according to claim 10, characterized by means for introducing cleaning water into the or each line when a depression is applied to the return line, such that the cleaning water is circulated through the lines and is collected in the tank for later disposal.

16. Spray apparatus according to claim 1 comprising a clear section in any one of the lines to provide a visual indication of contents.

* * * * *